United States Patent [19]

Mücke

[11] 4,016,573
[45] Apr. 5, 1977

[54] SHUTTER CONTROL FOR PHOTOGRAPHIC CAMERA APPARATUS

[75] Inventor: Dieter Mücke, Wildbad, Germany

[73] Assignee: Prontor-Werk, Alfred Gauthier GmbH, Postfach, Germany

[22] Filed: Sept. 8, 1975

[21] Appl. No.: 610,961

[30] Foreign Application Priority Data

Sept. 7, 1974 Germany .......................... 2442939

[52] U.S. Cl. .................................. 354/26; 354/231
[51] Int. Cl.² ........................ G03B 7/14; G03B 9/00
[58] Field of Search .................. 354/26, 36, 38, 48, 354/52, 59, 226, 231, 234, 235, 256, 259, 266, 230, 250

[56] References Cited

UNITED STATES PATENTS 3,097,583  7/1963  Rentschler ........................... 354/26
3,922,697  11/1975  Waaske ............................ 354/38 X

*Primary Examiner*—Donald A. Griffin
*Attorney, Agent, or Firm*—Arthur A. March

[57] ABSTRACT

This invention is directed to the control of a camera shutter mechanism by means of a pair of resilient control members. A first control member in the form of a fast acting spring is attached to the camera base member and, with operation initiates at a relatively low speed to provide an initial movement of the shutter control and overcomes the inertia of the mechanism and initiates its movement from a state of rest. This effect is preferably followed by a second effect provided by a second driving spring to achieve a substantially uniform movement of the mass of the mechanism first actuated, with the second driving spring acting continuously, following the initial operation, upon the shutter mechanism after a change from a rest position to one of movement. The first spring used to overcome the inertia of the mass of the operation, and effective only for the initial operation, is one which is heavy relative to the second spring and is arranged to initiate operation and transfer the drive from a cocked shutter position to control by the second spring which is much weaker but adequate to insure a substantially uniform movement of the mass of the shutter control which is active continuously for the desired shutter aperture opening period. A single control device is used to initiate the entire operation and to effect the sequential spring control.

9 Claims, 5 Drawing Figures

SHUTTER CONTROL FOR PHOTOGRAPHIC CAMERA APPARATUS

The invention relates to a driving device for an automatic time-aperture shutter for a camera. The aperture system of this device covers the exposure aperture and is moveable by means of a spring drive, with interposed movable masses, at relatively low speed from the closed to the open position.

In camera shutters having spring operated opening and closing blades or automatic time-aperture control, in which after release of the shutter and opening blades simultaneously carry out the function of the aperture, move at slow but uniform speed into the open position and the open closing blades begin to close still during the opening operation. The drive of the opening system has proved problematic inasmuch as a significant development, on the one hand, presupposes a relatively weak spring for obtaining a greater expansion of the opening movement, but, on the other hand, having to ensure that the relatively large masses of the opening system to be accelerated with absolute reliability are moved out of their inoperative position. This is obtainable only with a strong spring. Owing to these two such contradictory requirements a spring drive which uses only one spring for the opening system cannot produce an optimally satisfactory result. If on conceiving the spring drive for the opening system a relatively weak spring is adopted, there was no assurance that this spring can accelerate the masses to be moved, with their high inertia, with the required reliability from a state of rest into a state of movement. If on the other hand a strong spring were to be used, the latter would accelerate the opening system to such a considerable extent that an additional retard mechanism counteracting the opening movement of the opening system would have to be provided.

It is an object of the invention to provide a remedy in this respect or to provide a driving device for the opening system operating so as to function reliably and which takes into account the aforesaid requirements in the same optimal manner.

According to the present invention there is provided a driving device for an automatic time aperture shutter, the opening system of which, covering the exposure opening, is movable from the closed to the open position by means of a spring drive and interposed movable masses having a relatively low speed, the spring drive of the opening system including a relatively strong spring adequate for overcoming the inertia of masses to be accelerated and coming into effect only during the initial movement phase of these masses, and a further relatively weak spring which provides a substantially uniform movement of the masses to be accelerated and acts continuously thereon.

In this manner it is ensured that during the drive of the opening system the masses are reliably accelerated from the state of rest into the state of movement and the blades of the opening system from the beginning of the starting action to the end of the movement action are driven at least at a substantially uniform speed.

In a preferred embodiment of the invention the spring used for overcoming the inertia of the masses of the opening system is a flat spring and the further spring ensuring the uniform movement action is a coil spring. One of the most essential advantages of this kind of spring combination is based on the fact that it may be realized with a relatively low cost and minimal manufacturing expenditure. Particularly favorable conditions are obtainable on using the spring combination in accordance with the invention in that the acceleration spring is located horizontally in the movement path of the setting member acting to transfer the spring drive into the cocked position, and only a slight use of force is required over the majority of the movement path, the relatively strong spring only acting over the end phase of the tension movement.

The invention is described below further by way of example, with reference to the accompanying drawings, in which.

Figure 3:
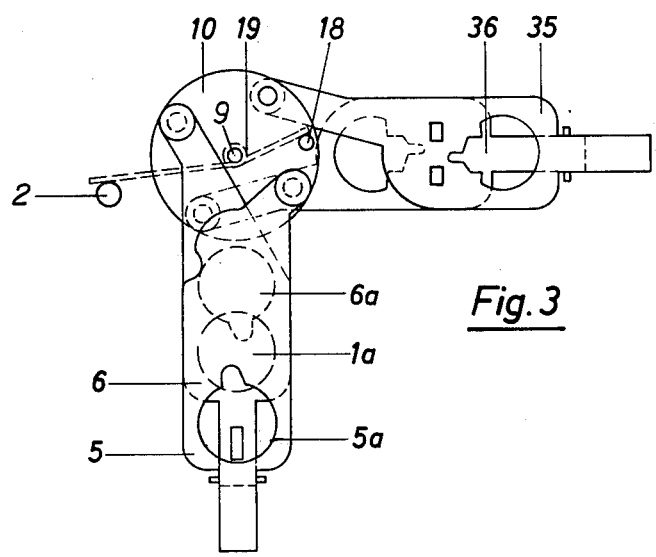
FIG. 3 is the opening system associated with the exposure aperture of the shutter and connected crank-like to a rotatably mounted flywheel, which system may have associated therewith a further opening system connected in front of a light-sensitive receiver of the camera for obtaining an automatic light-dependent time and aperture control.
Figure 5:
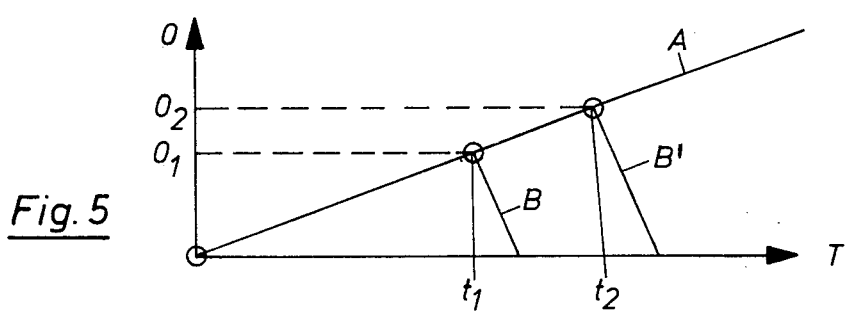
FIG. 5 is a functional diagram for the arrangement.

In the drawings the reference numeral 1 indicates a base member, preferably made of plastic material by way of an injection moulding method, on which, by means of two screws or the like (not shown) metal bearing plates 3 and 4 mutually supported by a transverse rib 2 are secured. As shown especially in FIG. 1, the base member 1 has an exposure opening or aperture 1a which is covered by a shutter system which preferably includes an arrangement for gradually opening the aperture and formed by two opposing blades 5 and 6. Each of these two blades 5 and 6, as clearly shown in FIG. 3, is provided with an opening 5a or 6a, their arrangement being such that an opposite displacement of the blades 5 and 6 provides a gradually widening light aperture concentric with the exposure aperture 1a of the camera shutter. These blades 5 and 6 have associated therewith, indicated by broken lines, an arrangement of two blades 7 and 8, for closing the gradually widening light passage aperture exposed by the opening system 5, 6 after time interval $t_1$ or $t_2$ measured from the beginning of the opening movement of the blades 5 and 6, as indicated in the diagram of FIG. 5. This time $t_1$ or $t_2$, determines the amount of the light passage opening $O_1$ or $O_2$ exposed by the opening system 5, 6 which hence represents the aperture opening of the shutter system. The combination of an opening and closing system is characteristic of automatic time-aperture shutters in which, as shown by the diagram of FIG. 5, the exposure of the exposure aperture by the opening system 5, 6 occurs relatively slowly as indicated by the shallow rising aperture flank A, whilst the closing of the exposure aperture by the closing system 7, 8 on the other hand, occurs relatively quickly as indicated by the steeply dropping closing flank B or B'. Each opening or aperture value therefore has a definite exposure time value associated therewith.

Figure 2:
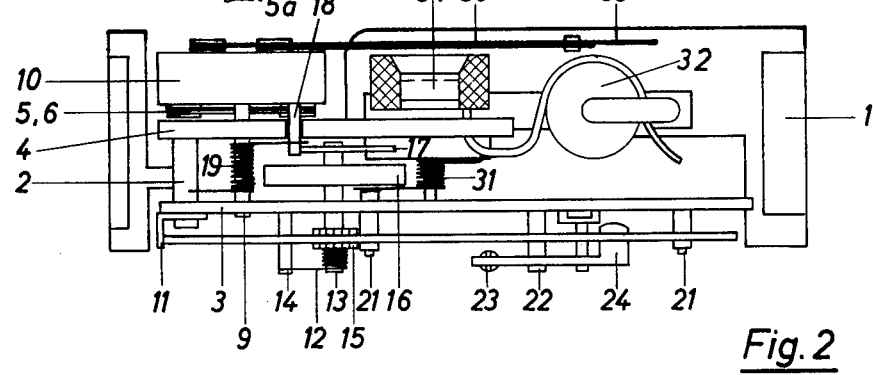
FIG. 2 is a plan view of the view of FIG. 1.

To obtain a greater movement action of the opening system 5, 6 in an automatic time-aperture shutter with simple and functionally reliable operating means, the blades, as shown in FIGS. 2 and 3, may be hingedly connected to a cylindrical body 10 rotatably mounted by means of an axle or spindle 9 in the plates 3 and 4. The blades 5 and 6 are mounted in such a manner that, as soon as this body 10 is rotated they carry out an opposing relative displacement to one another. As a result the openings 5a and 6a will expose a constantly widening light passage aperture in the region of the exposure opening 1a of the camera shutter. For this purpose the cylindrical body 10 is adapted to be driven by means of a spring drive including both a relatively strong spring 11 with impulse-like energy output and a relatively weak slow acting spring 12. The relatively strong spring 11 is preferably formed as a flat spring. The relatively weak spring 12, however, is formed as a coil spring which is provided with several convolutions. The spring 12 is mounted on a shaft or spindle 13 which, in turn, is rotatably mounted in the bearing plates 3 and 4. At one end, the coil spring 12 is supported against a fixed pin 14, while at the other end it engages a pinion 15 non-rotatably mounted on the shaft or spindle 13. A cylindrical disc 16 and an eccentric disc 17 are rotatably mounted to this shaft 13 and a pin 18 abuts the periphery of disc 17. This pin 18 is located on one flat side surface of the cylindrical body 10 and in combination with the eccentric disc 17 carries out the function of a reduction gear. The pin 18 is held by action of a spring 19, which is mounted on the axle or spindle 9, in constant abutment with the eccentric disc 17. If the eccentric disc 17 rotates, then the cylindrical body 10 with constant reduction of the angular speed is caused to rotate on its axle in the opposite direction.

A setting slider member 20 having a toothed portion 20a and preferably adapted as a slider, is in geared connection with the pinion 15. The setting slider 20 is slidably guided relative to the bearing plate 3 by means of pins 21 and elongate slots 20b, in which the pins 21 engage. If the setting slider 20 is moved into the cocked position, shown in FIGS. 1 and 2, at the end phase of its displacement movement it abuts against and tensions the plate spring 11 secured to the plate 3. In order now to retain the setting slider in the cocked position against the action of this spring 11 a saw-like toothing 20c is formed on the slider which co-operates with a catch lever 24 rotatably mounted on a pin 22 tensioned by the action of spring 23. The spring-loaded catch lever 24, during the displacement of the setting slider 20 into the cocked position, ratchets over the toothing 20c until finally engaging at the outermost tooth.

Figure 4:
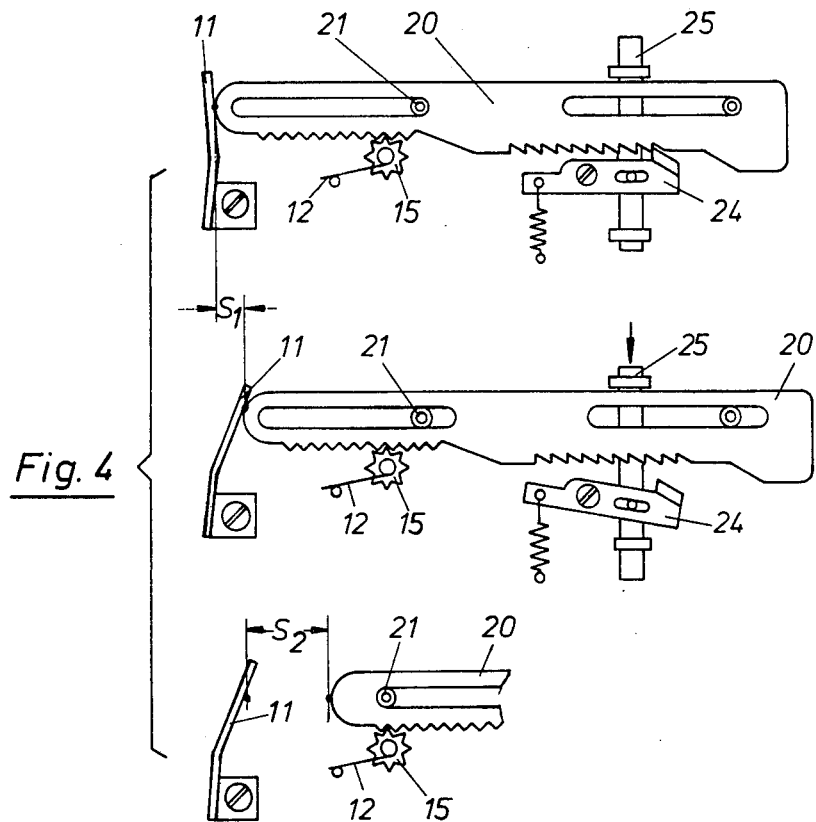
FIG. 4 shows the setting member participating in the movement action of the spring drive for the opening system in both the cocked or original position and in the two movement phases.

Simultaneously with the displacement of the setting slider 20 via the pinion 15 the coil spring 12 also has been tensioned. The setting slider 20 now remains in the locked position until a release button 25 is actuated which is in operational engagement with the catch lever 24. The release button 25 thereby removes the catch lever 24 from engagement with the toothing 20c of the setting slider 20. This action releases the drive of the opening system 5, 6 of the camera shutter for action. When this occurs, then the power storage means in the form of the flat spring 11 and coil spring 12 come into action and by overcoming the inertia of the accelerating masses including the discs 16 and 17, the cylindrical body 10 etc., the opening system 5, 6 is moved. The action of the flat spring 11 is limited to overcoming the inertia of these masses, which means that by the end of the movement phase $S_1$ indicated in FIG. 4 it already loses its effectiveness, since the setting slider 20 by continuing its movement disengages therefrom. During its further movement action, i.e. within the movement phase $S_2$, the masses are then retained in a uniform state of movement subject only to the influence of the relatively weak coil spring 12. This action prevails during overcoming the frictional resistances by the coil spring 12 until the setting slider 20, after passing through the movement phases $S_1$ and $S_2$, assumes the end position also shown in FIG. 4.

The covering of the gradually widening light passage aperture exposed by the blades 5 and 6 is effected by the closing system. The blades 7 and 8 thereof are adapted to be driven in known manner, for example, by a two-armed lever 29, which in turn is pivotally mounted on an axle or pin 30 and subject to the action of a relatively strong driving spring 31. The driving lever 29 preferably formed as an anchor lever is retained in the cocked position shown in FIG. 1 by an electromagnet 32 acting on one of its ends and which is connected in the circuit of a known electronic exposure control circuit (not shown). From this control circuit the electromagnet 32 after connection or after a certain time interval releases the driving lever 29.

Figure 1:
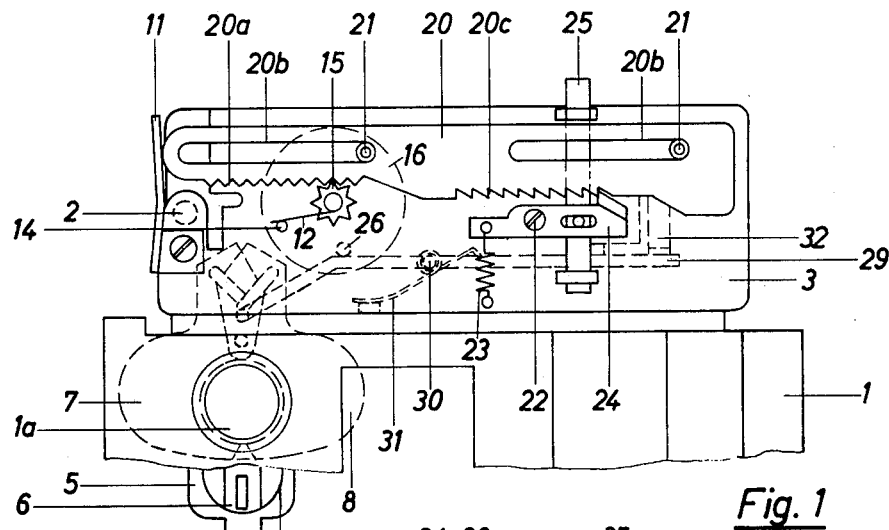
FIG. 1 is a partial view of a shutter assembly of a camera in side view and in the cocked position.

When the electromagnet 32 releases the lever 29, the latter under the action of the relatively strong spring 31 engaging thereon, drives the closing system 7, 8 and therewith causes a covering of the light passage aperture exposed by the opening system 5, 6. In accordance with the closing slope B or B', shown in FIG. 5, the light passage opening can thus be closed again before the blades 5 and 6 have exposed the full light passage. A pin 26 is provided in the disc 16 so that at the end of the cocking movement of the setting slider 20 the driving lever 29 is returned into abutment with electromagnet 32 with simultaneous return of the blades 7, 8 from the closed into the open position, as shown in FIG. 1.

If it is intended to make the driving of the exposure control circuit dependent upon the lighting conditions, then this may be effected in a simple manner by using a light sensitive element in the circuit of the electronic control circuit, for example, by using a photo diode which, as known, is distinguished by an extremely low inertia behavior. For the purpose of such a lighting-dependent automatic time aperture shutter the photo diode, which in FIG. 2 is denoted by 34, needs only an opening system connected in front of it, which in a similar manner as the forming of the light passage or aperture opening system 5, 6 may be formed of two opposing blades 35 and 36. These blades like the opening blades 5 and 6 may be hingedly mounted on the cylindrical body 10, as shown in FIG. 3.

The linearly guided setting slider 20 for transmitting the driving force from the flat spring 11 to the spring drive of the masses to be accelerated may also be replaced by a rotatably mounted setting member if considered necessary for the structural configuration of the shutter. The setting member, for example, could be formed segment lever-like and at one end be provided with a toothing which like that of the setting slider 20 engages with a pinion connected to the spring drive.

What is claimed as the invention is:

1. A driving device for an automatic time aperture shutter, the opening system of which, covering the exposure opening, is movable from the closed to the open position by means of a spring drive and interposed movable masses having a relatively low speed, the spring drive of the opening system including a relatively strong spring adequate for overcoming the inertia of masses to be accelerated and coming into effect only during the initial movement phase of these masses, and a further relatively weak spring which provides a substantially uniform movement of the masses to be accelerated and acts continuously thereon.

2. A device according to claim 1, wherein the relatively strong spring used to overcome the inertia of the moving masses of the opening system is adapted as a flat spring, and the further relatively weak spring ensuring the uniform movement action is adapted as a coil spring.

3. A driving device according to claim 2, in which the flat spring is located in the movement path of a setting member used to transfer the spring drive into the cocked position.

4. A device according to claim 1, in which the accelerating spring is located in the movement path of a setting member used to transfer the spring drive into the cocked position.

5. A control device for a shutter aperture mechanism carried on a camera base which is controlled for effecting a movement from a state of the shutter where the exposure opening is changed from a closed to an open position, comprising:

a first resilient member connected to the shutter mechanism for overcoming, with its operation, the mechanism inertia only to start shutter operation, a second resilient member connected to the shutter mechanism and effective following the initial operation provided by said first resilient member to provide a substantially uniform operation of the shutter mechanism from a closed to an open position following the initial acceleration by the first resilient member, the resilient members being of such character that the first of said members exerts a substantially greater moving force than the second member, and means to initiate the operation of the controlling resilient members.

6. The shutter control mechanism of claim 5 wherein the first resilient member is a flat spring, and means to attach the said spring to the camera base and, following operation initiation, so that it can be carried in an operative state.

7. The shutter control mechanism as claimed in claim 5 comprising, in addition, a release button on the camera base connected to initiate release of the first spring member.

8. The shutter control of claim 5 comprising, in addition, means to transfer the control of the shutter movement and operation from the first to second spring members.

9. The camera shutter control as claimed in claim 5 wherein the second spring member is a coil spring, and means to connect said spring to move the shutter control mechanism following cessation of operation of the first resilient means, thereby to move said mechanism at a substantially uniform rate between its closed and open positions.

* * * * *